United States Patent [19]

Fenner et al.

[11] Patent Number: 4,732,112

[45] Date of Patent: Mar. 22, 1988

[54] BIRD FEEDER

[75] Inventors: Ronald C. Fenner, Ithaca; Brian A. Fenner, Groton, both of N.Y.

[73] Assignee: Cornell Research Foundation, Inc., Ithaca, N.Y.

[21] Appl. No.: 894,533

[22] Filed: Aug. 8, 1986

[51] Int. Cl.$^4$ .............................................. A01K 39/00
[52] U.S. Cl. ................................ 119/52 R; 119/51 R; 119/53
[58] Field of Search ....................... 119/52 R, 51 R, 53

[56] References Cited

U.S. PATENT DOCUMENTS

| | | |
|---|---|---|
| 54,094 | 11/1919 | Johnson . |
| D. 265,938 | 8/1982 | Kilham . |
| D. 278,088 | 3/1985 | Kilham . |
| 996,214 | 6/1911 | Cockrum .................. 119/52 R |
| 1,091,392 | 3/1914 | Schlichtinger .......... 119/52 R |
| 2,591,459 | 4/1952 | Meany ...................... 119/52 R |
| 2,725,663 | 12/1955 | Mullen ...................... 119/52 R |
| 3,244,150 | 4/1966 | Blair ......................... 119/52 R |
| 3,372,676 | 3/1968 | Williams ................... 119/52 R |
| 3,796,190 | 3/1974 | Stoll . |
| 4,223,637 | 9/1980 | Keefe ....................... 119/52 R |

FOREIGN PATENT DOCUMENTS 79753 5/1894 Fed. Rep. of Germany .... 119/52 R

OTHER PUBLICATIONS

Bird Feeder How-To Book, selected pages (title and date unknown).
"Democratic Feeder", Comfortably Yours Aids for Easier Living, (#M4338).

Primary Examiner—Carl D. Friedman
Assistant Examiner—Richard E. Chilcot, Jr.
Attorney, Agent, or Firm—Jones, Tullar & Cooper

[57] ABSTRACT

A bird feeder which utilizes the common necked container such as a plastic soda or soft drink bottle as the feed storage container, with its screw neck downward, attached to a conduit, hood and cup assembly and a perch extending around the cup. The container holds an ample supply of feed, which flows by gravity through a conduit to refill the cup as birds remove the feed. A hanging device on the container bottom provides an attachment point for the hanging up the feeder.

9 Claims, 4 Drawing Figures

BIRD FEEDER

BACKGROUND OF THE INVENTION

The present invention is a novel bird feeder. Bird feeders in the prior art are of many different designs; post mounted, cantilevered from a window sill and hung from a bracket or tree. The materials include wood, glass and plastic. Most designs hold several days supply of feed. Large heavy feeders are generally post mounted. More common are lightweight feeders that can be mounted or hung by a variety of means.

Included in the prior art is a tubular bird feeder with multiple openings at various heights. As the level of the feed drops only the lower perches are useful for feeding. Some designs specifically favor small songbirds while others permit both small and large birds. Feeder perches are disclosed in design patents DES No. 265,938 and DES No. 278,088 to Kilham, the latter discourages large birds by extending probes outward from the feed chamber just above the perch.

While the prior art includes bird feeders in a variety of designs it is apparent that there is need for a light weight, low cost, easily assembled and readily refilled bird feeder that can be made for small birds only or for both small and large birds, and which protects the feed from squirrels and other animals.

SUMMARY OF THE INVENTION

The present invention is a bird feeder. More specifically it is a bird feeder which utilizes a necked container, such as a glass or plastic bottle, e.g. a soda or soft drink bottle, to hold a supply of feed. The feed container is an inverted container having a neck with a male closure-engaging mechanism, such as a screw neck or snap fitting, removably attachable to an annular connecting member having a complimentary female mechanism adapted to secure and hold the male closure-engaging mechanism of the feed container. The annular connecting member is attached to the upper end of a conduit, tube or other suitable passageway to form a continuation thereof, and the lower end of the conduit is attached to a cup that holds the feed in a manner which permits the birds to feed. In the present embodiment the conduit is glued to the center of the inside bottom of the cup. As feed is removed from the cup it is replenished by a gravity flow of feed from the container, through the conduit, passing through openings or ports proximate the lower end of the conduit into the cup. If desired, a protective device such as a hood or shield extends outward from the connecting member or conduit, spaced above the cup, to prevent or retard rain, snow and airborne contaminants from entering the cup. If desired the cup bottom may have holes or other devices to allow water, if it enters the cup, to flow out of the cup while retaining the feed. A perch attached to the cup, outwardly and downwardly positioned therefrom, permits birds to alight for feeding. Further if desired, a hanging device, such as a hook or a screweye, passes through or is attached to the bottom of the container to allow the feeder to be hung up.

In order to utilize containers with varying neck sizes and or closure means, an adaptor or reducing device can be inserted between the container neck and the connecting member which fixes the container to the remainder of the assembly. For example, if the connecting member is made to receive a 3 liter soft drink bottle neck, the adapter can be designed so that a 2 or 1 liter size soft drink bottle can be employed as the feed container.

It is an object of the present invention to provide a novel bird feeder.

It is a further object of the present invention to provide a bird feeder that can utilize as the feed container, a previously used container or bottle such as a plastic soda or soft drink bottle.

Yet another object of the present invention is to provide a bird feeder that can utilize various sizes of feed containers, for example one and two liter plastic or glass bottles.

It is also an object of the present invention to provide a bird feeder having a perch for small birds only.

Another object is to provide a bird feeder with a omi-positional perch for both small and large birds.

Yet another object is to provide a bird feeder that shields the feed from contaminants and the elements.

It is an object of the present invention to provide a bird feeder that is easily assembled, readily refilled, attractive in appearance and low in cost.

The foregoing and other features and advantages of the present invention will become apparent to those skilled in the art from a consideration of the drawings, from the detailed description and from the preferred embodiment which is disclosed hereinafter.

DESCRIPTION OF THE PREFERRED EMBODIMENT

Figure 1:
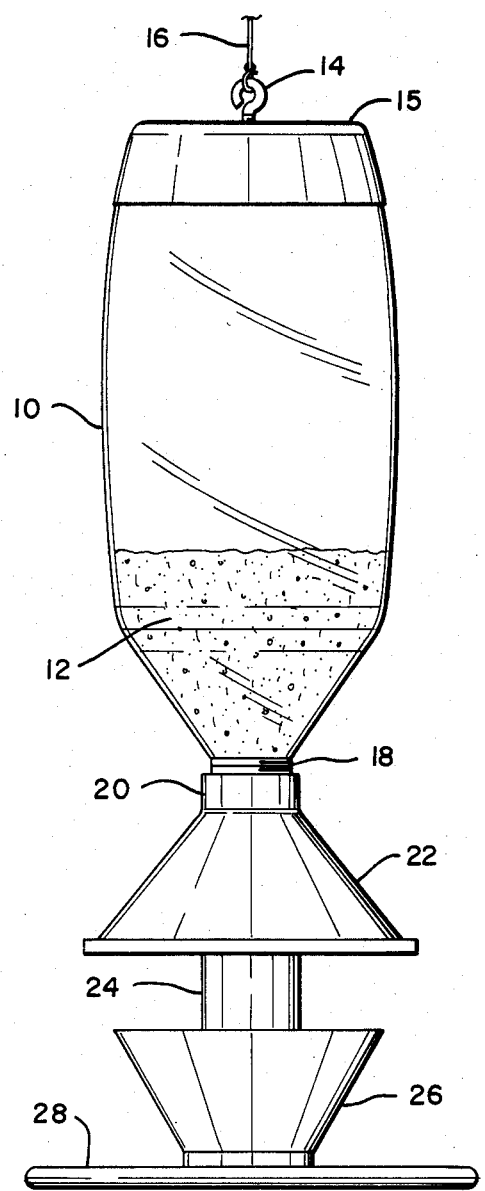
FIG. 1 is a view of the assembled bird feeder of the present invention.
Figure 2:
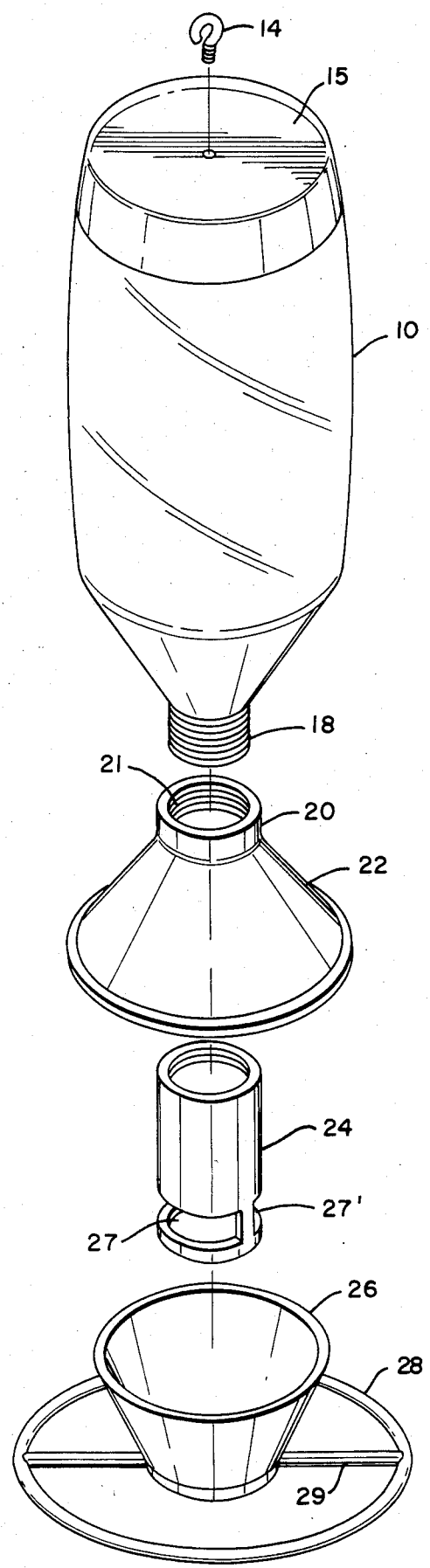
FIG. 2 is an exploded view of the bird feeder.

Referring first to FIGS. 1 and 2, wherein the assembled preferred embodiment of the invention is shown, a necked feed container 10 is partially filled with bird seed 12. Hook or hanger 14 is fastened to the bottom 15 of the container and a complimentary hanging or securing device 16 loops through the hanger 14 to suspend the feeder from a bracket or a tree branch. A male closure-engaging mechanism 18 for the container which may be an externally-threaded neck portion on the container, is removably attached to an annular connecting member 20 which has a female mechanism 21 such as an internally-threaded sleeve adapted to secure and hold the male closure-engaging mechanism. A conduit 24 is attached at its upper end to annular connecting member 20, and may be integrally molded therewith or may be secured by glueing. A protecting cover 22 in the preferred embodiment is a shield or hood which flares outwardly and downwardly from annular connecting member 20. Conduit 24 connects to a feed cup 26 at its lower end and may be adhesively secured, integrally molded, or otherwise fastened. The feed flows down the conduit 24 and out through openings or ports, not shown in FIG. 1, to replenish the feed in cup 26 as birds remove feed from the cup. Attached to cup 26 is a perch 28 on which birds alight and stand while feeding.

Now referring to FIG. 2 an exploded view of the preferred embodiment, conduit 24 is shown in more detail, with openings or dispensing ports 27 and 27' at its lower end through which the feed can flow freely into the cup 26. Also shown more clearly is perch 28, which in this embodiment is circular, but can be of any reasonable shape attached to cup 26 by crossbar 29. While in FIG. 2 the protecting cover 22 and the conduit 24 are shown as two distinct pieces, a single molding or other manufacture of a combination of the conduit and the protecting cover is another embodiment not shown. This is true of the entire assembly, except for the detachable feed container, for the number of distinct pieces is not critical so long as the resultant assembly provides the functions enumerated.

Figure 3:
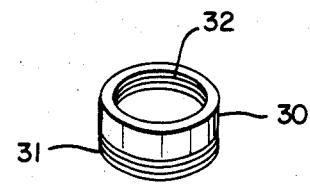
FIG. 3 is a view of a screw thread reducing device which can be inserted between the container neck and the connecting member to adjust for varying container neck sizes.

FIG. 3 shows an annular adaptor 30 which, if desired, is removably insertable into annular connecting member 20 to effectively reduce the size of the annulus of the connecting member. Use of the adapter 30 allows the use of feed containers with varying size necks or having varying closure engaging devices. The annular adaptor 30 has an external engaging device 31, such as external threads, adapted to fit into and secure with the complementary female engaging device 21 of the connecting member 20, and internal engaging device 32 such as internal threads in turn adapted to secure and hold the complementary male closure-engaging device 18.

Figure 4:
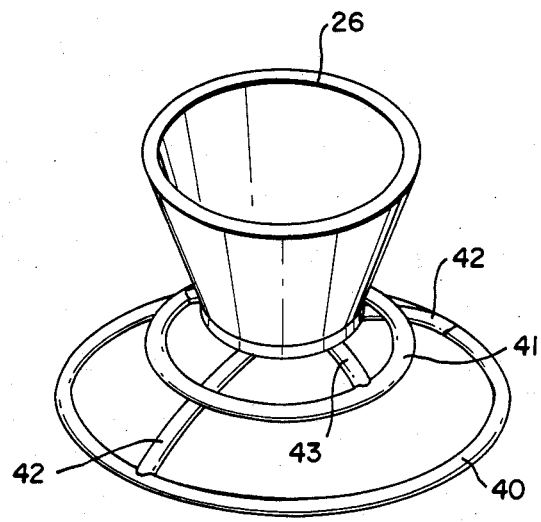
FIG. 4 is a representation of an alternative perch arrangement.

FIG. 4 is an alternative perch arrangement which can replace the perch 28 in FIGS. 1 and 2. As in FIGS. 1 and 2 the perch is attached to the cup 26, for example by glueing or snapping into a complementary recess molded into the bottom of the cup. As shown in FIG. 4 the alternative perch comprises two horizontal perching areas, the first, for example ring 40, being spaced both horizontally and vertically more remote from the cup than the second, for example ring 41. The two perching areas allow larger birds to eat using the first perching area, while small birds find the second area more accommodating since it allows them to comfortably stand and feed. The perch areas are joined to the cup by suitable supports, for example arched rib 42. In the embodiment shown, further rigidity is provided by additional crossmember 43.

While the bird feeder of the present invention has been shown and fully and completely described in the preferred embodiment above, it will be obvious to one of skill in the art that a number of changes could be made without departing from the true spirit and scope of the present invention. Accordingly, all modifications, alterations, changes and the like, which fall within the spirit and scope for the invention as set forth in the appended claims are included herein.

We claim:

1. A bird feeder which comprises:
   a container for holding a supply of feed, said container including a neck portion having external closure-engaging means;
   an annular connecting member having an upper end and a lower end, and having internal engaging means cooperating with said external closure-engaging means on said container, to secure and hold said connecting member on said container neck;
   tubular conduit means having an upper end attached to said annular connecting member and having a lower end;
   a feed-receiving cup attached to said lower end of said conduit means;
   dispensing ports in said conduit means proximal to said lower end of said conduit means to permit feed to flow through said conduit from said container into said cup;
   cover means connected to the lower end of said connecting member and flaring outwardly and downwardly therefrom to shield said cup from contaminants; and
   a perch secured to said cup.

2. A bird feeder as recited in claim 1 wherein said container is a plastic bottle.

3. A bird feeder as recited in claim 1 wherein said container is a glass bottle.

4. A bird feeder as recited in claim 1 further comprising a hanging means.

5. A bird feeder as recited in claim 1 further comprising an annular adapter means having an outer male connecting means and an inner female connecting means placed between said annular connecting member and said container to permit use of containers having differing size necks.

6. A bird feeder as recited in claim 1, wherein said perch connected to said cup is placed close to the cup so that only small birds are able to comfortably stand and feed.

7. A bird feeder as recited in claim 1, wherein said perch connected to said cup is positioned close to the cup in one region and further from the cup at a second region so that both small and large birds are able to feed.

8. A light weight, low cost, easily assembled bird feeder which comprises:
   a plastic bottle-like container having a neck portion with external closure-receiving threads, said container receiving a supply of feed to be dispensed;
   a cylindrical connector having an upper end and a lower end, and having internal threads cooperating with said external threads on said container to secure said connector on said container neck;
   tubular conduit means having an upper end attached to the lower end of said connector and having a lower end, said tubular conduit forming a feed flow path from said container;
   a feed-receiving cup attached to said lower end of said conduit means;
   dispensing ports near the lower end of said conduit means to allow feed to flow from said conduit into said cup;
   cover means integrally formed with and located at the lower end of said connector, said cover means including an outwardly and downwardly flaring shield extending from said connector over said cup to protect said cup from contaminants; and
   a perch secured to said cup.

9. The bird feeder of claim 8, wherein said connector, said conduit means and said cover comprise a single, integral element of said feeder.

* * * * *